United States Patent [19]

Sasazawa et al.

[11] Patent Number: 4,584,282
[45] Date of Patent: Apr. 22, 1986

[54] DIELECTRIC CERAMIC COMPOSITION

[75] Inventors: Kazuo Sasazawa; Nobutatsu Yamaoka, both of Tokyo, Japan

[73] Assignee: Taiyo Yuden Kabushiki Kaisha, Tokyo, Japan

[21] Appl. No.: 692,439

[22] Filed: Jan. 17, 1985

[30] Foreign Application Priority Data

Jan. 23, 1984 [JP] Japan .................... 59-11489

[51] Int. Cl.⁴ .................... C04B 35/46; C04B 35/49
[52] U.S. Cl. .................... 501/136; 501/134; 501/152; 501/102
[58] Field of Search .......... 501/134, 105, 102, 136, 501/152, 154

[56] References Cited

U.S. PATENT DOCUMENTS 4,102,696 7/1978 Katsube et al. .......... 501/134
4,339,543 7/1982 Maye et al. .......... 501/134
4,468,472 8/1984 Kashima et al. .......... 501/152

Primary Examiner—William R. Dixon, Jr.
Assistant Examiner—Karl Group
Attorney, Agent, or Firm—Flynn, Thiel, Boutell & Tanis

[57] ABSTRACT

Dielectric ceramic compositions consisting essentially of $xZrO_2$-$yCeO_2$-$zSiO_2$-$TiO_2$ in which $x+y+z=1$ and x, y and z are represented within ranges by mole surrounded by a polygon having at its corners the points A, B, C and D of a ternary composition diagram of the attached drawing defined as follows,

|   | x    | y    | z    |
|---|------|------|------|
| A | 0.98 | 0.01 | 0.01 |
| B | 0.60 | 0.39 | 0.01 |
| C | 0.60 | 0.18 | 0.22 |
| D | 0.77 | 0.01 | 0.22 |

At least one oxide selected from the group consisting of $Al_2O_3$, $La_2O_3$ and $Cr_2O_3$ may be further added to the above composition in an amount of from 0.05 to 1.0 parts by weight per 100 parts by weight of the above four components.

5 Claims, 1 Drawing Figure

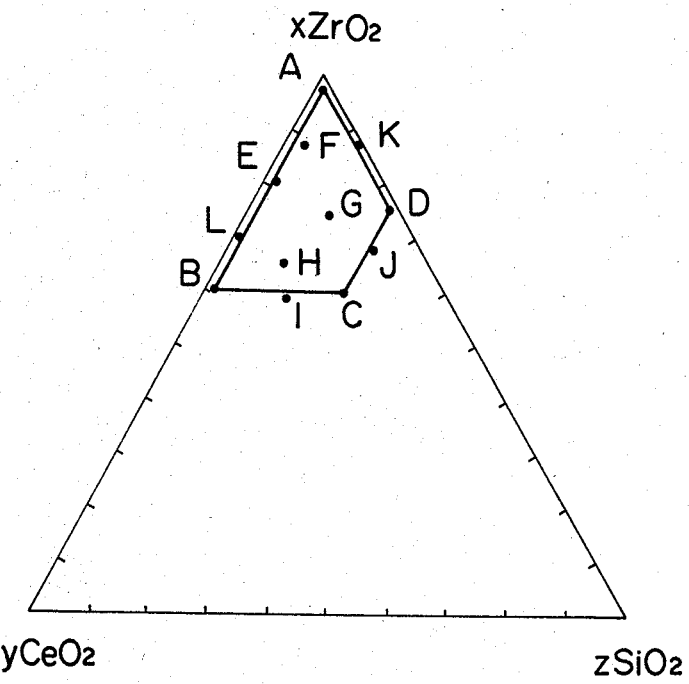

DIELECTRIC CERAMIC COMPOSITION

BACKGROUND OF THE INVENTION

1. Field of the Invention

This invention relates to dielectric ceramic compositions which are useful as materials for dielectric resonator.

2. Description of the Prior Art

In recent years, there have been widely used radio apparatus which are employed in frequency ranges of several GHz, e.g. so-called personal radio apparatus and automotive telephones. Dielectric ceramics for use as dielectric resonators which are conventionally built in such radio apparatus are, for example, $MgO-CaO-TiO_2$ ceramics and $BaO-TiO_2$ ceramics. The articles obtained from the known ceramics have a specific inductive capacity of 20–40 and a surface roughness, Rmax, of 3–4 μm. The temperature characteristics of resonance frequency of resonators made of these ceramics are in the range of +100 to −100 ppm/°C. A no-load Q value is in the range of about 4000 to 7000. Thus, the ceramics themselves involve little or no practical problems with respect to the characteristics thereof.

However, the known ceramic articles have the serious problem that the insertion loss is great. This is attributed to the fact that a surface resistance, Rs, of a conductor coated on the surface of the ceramic articles is higher by 50 to 60% than a surface resistance, Rso, of a conductor coated on a ceramic article having a smooth surface. In order to lower the surface resistane, Rs, it is necessary to make ceramic articles having a small surface roughness, Rmax. Accordingly, there is a high demand of development of dielectric ceramic compositions which are able to produce articles which are better in surface condition than the known ceramic compositions.

SUMMARY OF THE INVENTION

It is therefore an object of the present invention to provide dielectric ceramic compositions which can provide molded articles having a surface roughness not larger than 2 μm.

It is another object of the invention to provide dielectric ceramic compositions which ensure a temperature characteristic of resonance frequency, ηf, of −30 to +30 ppm/°C. in a temperature range of from +25° C. to +85° C. when applied as dielectric resonators.

The above objects can be achieved, according to the present invention, by a dielectric ceramic composition which consists essentially of $xZrO_2$-$yCeO_2$-$zSiO_2$-$TiO_2$ in which $x+y+z=1$ and x, y and z are molar fractions lying within the polygon having the points A, B, C and D at its corners of the attached ternary composition diagram, wherein the molar fractions at points A, B, C and D are defined as follows,

|   | x | y | z |
|---|---|---|---|
| A | 0.98 | 0.01 | 0.01 |
| B | 0.60 | 0.39 | 0.01 |
| C | 0.60 | 0.18 | 0.22 |
| D | 0.77 | 0.01 | 0.22 |

Further, at least one oxide selected from the group consisting of $Al_2O_3$, $La_2O_3$ and $Cr_2O_3$ may be further added to the above composition in an amount of from 0.05 to 1.0 parts by weight per 100 parts by weight of the above four components.

BRIEF DESCRIPTION OF THE DRAWING

The drawing is a ternary composition diagram showing the molar proportions of a ceramic composition according to the invention.

DETAILED DESCRIPTION OF THE INVENTION

As described before, the dielectric porcelain composition of the invention consists essentially of $xZrO_2$-$yCeO_2$-$zSiO_2$-$TiO_2$ in which $x+y+z=1$. In addition, x, y and z are molar fractions lying within the polygon having the points A, B, C and D, at its corners of the attached ternary composition diagram of the FIGURE difined as follows,

|   | x | y | z |
|---|---|---|---|
| A | 0.98 | 0.01 | 0.01 |
| B | 0.60 | 0.39 | 0.01 |
| C | 0.60 | 0.18 | 0.22 |
| D | 0.77 | 0.01 | 0.22 | whereby the ηf value is controlled to be within a range of −30 to +30 ppm/°C. when the composition is applied as a resonator.

The reasons why the molar ratios of the respective components are defined as such are described with reference to the accompanying drawing showing a ternary composition diagram.

Outside the range at the side of I in the FIGURE, the temperature characteristic of resonance frequency, ηf, becomes larger in absolute value than as intended at the minus side.

Similarly, outside the range at the side of J, the surface roughness, Rmax, of a substrate made of the ceramic becomes larger than an intended value.

Outside the range at the side of K, the ηf value is larger than an intended value at the plus side and outside the range at the side of L, the surface roughness, Rmax, becomes larger than an intended value.

In the practice of the invention, at least one oxide such as $Al_2O_3$, $La_2O_3$ or $Cr_2O_3$ which is added to the above composition serves to lower the surface roughness, Rmax, of molded articles obtained from the resultant ceramic composition. If the amount of the at least one oxide is less than 0.05 part by weight per 100 parts by weight of the main composition, satisfactory effects of the at least one oxide cannot be obtained. On the other hand, when the amount exceeds 1.0 part by weight, the intended ranges of values of the respective characteristics defined before cannot be obtained. More particularly, if $Al_2O_3$ or $Cr_2O_3$ is added in larger amounts, the temperature characteristic of resonance frequency, ηf, becomes larger than the intended value. Similarly, if the amount of $La_2O_3$ increases, the surface roughness, Rmax, becomes larger than the intended value with the tendency toward an increasing dielectric loss.

The ceramic composition of the invention can be readily molded into desired shapes suitably used as substrates for resonator by any ordinary manner. This is particularly described in examples.

EXAMPLE 1

In this example, eight samples were made using ceramic compositions of the invention without including at least one oxide.

$ZrO_2$, $CeO_2$, $SiO_2$ and $TiO_2$, each having a purity of 99%, were weighed so that x, y and z in the composition of $xZrO_2$-$yCeO_2$-$zSiO_2$-$TiO_2$ were controlled as shown in 1 to 8 of Table 1 and were mixed along with alcohol in a ball mill for 20 hours. Each mixture was dried and calcined at a temperature of 1100° C. for 2 hours, followed by milling. Thereafter, polyvinyl alcohol binder was added to the powder, followed by press molding under a pressure of 3 tons/cm² in the form of a disc and sintering at a suitable temperature of 1300° to 1380° C. which depended on the composition of the ceramic to obtain discs having a diameter of 8 mm and a thickness of 4 mm (samples 1–8).

These samples were each sandwiched between two brass plates which had a diameter of 24 mm and which were each plated with copper and mirror finished, thereby obtaining dielectric resonators. The resonators were subjected to measurements of specific inductive capacity, $\epsilon$, no-load Q value, temperature characteristic of resonance frequency, $\eta f$ and surface roughness, Rmax, with the results shown in Table 1.

The specific inductive capacity, $\epsilon$, was determined by first measuring a resonance frequency, fo, by a dielectric resonance method (by which it was found that all the samples had resonance frequencies of about 8.2 GHz) and calculating the capacity based on the measured frequency and the measured diameter and thickness of each sample. The no-load Q value was determined as follows: a half power width ($f_2$-$f_1$) and insertion loss $IL_o$ (dB) at a temperature of 25° C. were measured by the dielectric resonance method and the Q value was calculated based on the measured value and the resonance frequency fo. The temperature characteristic of resonance frequency, $\eta f$, was determined by measuring a resonance frequency in the temperature range of 25° to 85° C. and calculating the frequency per unit centigrade. The surface roughness, Rmax, was determined according to the method prescribed in JIS B 0601 in which the surface of each sample was measured using a needle-type surface roughness tester.

For comparison, ceramic compositions different from those compositions of the invention and indicated in (9) to (12) of Table 1 were used to make samples and dielectric resonators in the same procedure and conditions as described above. The resultant resonators were subjected to measurements of the respective characteristics in the same procedure as described above.

The ceramic compositions used as the starting materials for 1 to 8 and (9) to (12) which correspond to A through L in the ternary composition diagram of the attached drawing are also indicated in Table 1.

As will be clearly seen from the results in Table 1, the samples 1 to 8 of the present invention have a specific inductive capacity, $\epsilon$, of 38.2 to 42.7, a no-load Q value of 6400 to 7400, a temperature characteristic of resonance frequency, $\eta f$, of −19 to +28 ppm/°C., and a surface roughness, Rmax, of 1.5 to 2.0 μm. In contrast, the sample (9) corresponding to composition 1 in the ternary diagram had a $\eta f$ value of −40 ppm/°C. The sample (11) corresponding to composition K had a $\eta f$ value of −109 ppm/°C. Thus, the samples (9) and (11) were outside the range of the invention. Moreover, the samples (10), (11) and (12) corresponding to J, K and L had surface roughnesses of 3.3, 4.1 and 4.0 μm, which exceeded the intended value.

EXAMPLE 2

In this example, ceramic compositions comprising 0.05 to 1.0 parts by weight of $Al_2O_3$ per 100 parts by weight of $ZrO_2$, $CeO_2$, $SiO_2$ and $TiO_2$, as indicated in sample Nos. 1–9, 11–14 and 16–19 in Table 2, were used to make samples of the same form as in Example 1 in the same manner as in Example 1. Dielectric resonators of the same type as in Example 1 were made using these samples and subjected to the characteristic tests. For comparison, ceramic compositions of sample Nos. (10), (15) and (20) which were outside the range of the invention, i.e. 2.0 parts by weight of $Al_2O_3$ per 100 parts by weight of the main components, were used to make samples of the same form as used above and subjected to the characteristic tests.

The compositions and test results of these samples are shown in Table 2, in which the compositions of the main components are indicated corresponding to A through H in the ternary composition diagram.

As will be seen from the results of the table, the resonators using the samples of the invention (sample Nos. 1–9, 11–14 and 16–19) had a specific inductive capacity, $\epsilon$, of 35.0 to 42.4, a no-load Q value of 6000 to 7100, a temperature characteristic of resonance frequency, $\eta f$, of −20 to +26 ppm/°C., and a surface roughness, Rmax, of 1.0 to 1.9 μm. In contrast, the dielectric resonators using the samples (10), (15) and (20) comprising 2.0 parts by weight of $Al_2O_3$ per 100 parts by weight of the main components had, respectively, $\eta f$ values of −33, −36 and −37 ppm/°C., which were outside the range of the invention at the minus side.

EXAMPLE 3

In this example, ceramic compositions comprising 0.05 to 1.0 parts by weight of $La_2O_3$ per 100 parts by weight of $ZrO_2$, $CeO_2$, $SiO_2$ and $TiO_2$, as indicated in sample Nos. 1–9, 11–14 and 16–19 of Table 3, were provided to make samples of the same form as used in Example 1 in the same manner as in Example 1. Dielectric resonators of the same type as in Example 1 were made using these samples and subjected to the characteristic tests in the same manner as in Example 1. For comparison, ceramic compositions of sample Nos. (10), (15) and (20) which were outside the range of the invention, i.e. 2.0 parts by weight of $La_2O_3$ per 100 parts by weight of the main components, were used to make samples of the same form as used above and subjected to the characteristic tests.

The compositions and test results of these samples are shown in Table 3, in which the compositions of the main components are indicated corresponding to A through H in the ternary composition diagram.

As will be seen from the results of the table, the resonators using the samples of the invention (sample Nos. 1–9, 11–14 and 16–19) had a specific inductive capacity, $\epsilon$, of 35.1 to 42.6, a no-load Q value of 6100 to 7400, a temperature characteristic of resonance frequency, $\eta f$, of −19 to +28 ppm/°C., and a surface roughness, Rmax, of 1.0 to 1.9 μm. In contrast, the dielectric resonators using the samples (10), (15) and (20) comprising 2.0 parts by weight of $La_2O_3$ per 100 parts by weight of the main components had, respectively, surface roughnesses of 4.1, 4.5 and 4.6 μm, which were outside the range of the invention. In addition, the no-load Q values of the dielectric resonators using these comparative samples were, respectively, 3000, 2900 and 2100 which were lower than those values of the resonators of the invention obtained in this example.

EXAMPLE 4

In this example, ceramic compositions comprising 0.05 to 1.0 parts by weight of $Cr_2O_3$ per 100 parts by weight of $ZrO_2$, $CeO_2$, $SiO_2$ and $TiO_2$, as indicated in sample Nos. 1-9, 11-14 and 16-19 of Table 4, were provided to make samples of the same form as used in Example 1 in the same manner as in Example 1. Dielectric resonators of the same type as in Example 1 were made using these samples and subjected to the characteristic tests in the same manner as in Example 1. For comparison, ceramic compositions of sample Nos. (10), (15) and (20) which were outside the range of the invention, i.e. 2.0 parts by weight of $Cr_2O_3$ per 100 parts by weight of the main components, were used to make samples of the same form as used above and subjected to the characterisitic tests.

The compositions and test results of these samples are shown in Table 4, in which the compositions of the main components are indicated corresponding to A through H in the ternary composition diagram.

As will be seen from the results of the table, the resonators using the samples of the invention (sample Nos. 1-9, 11-14 and 16-19) had a specific inductive capacity, $\epsilon$, of 35.0 to 42.5, a no-load Q value of 6300 to 7500, a temperature characteristic of resonance frequency, $\eta f$, of $-22$ to $+28$ ppm/°C., and a surface roughness, Rmax, of 0.9 to 1.7 $\mu$m. In contrast, the dielectric resonators using the samples (10), (15) and (20) comprising 2.0 parts by weight of $Cr_2O_3$ per 100 parts by weight of the main components had, respectively, $\eta f$, values of $-36$, $-39$ and $-41$ ppm/°C., which were outside the range of the invention at the minus side.

EXAMPLE 5

In this example, ceramic compositions comprising 0.2 or 1.0 part by weight of at least two of $Al_2O_3$, $La_2O_3$ and $Cr_2O_3$ in total per 100 parts by weight of $ZrO_2$, $CeO_2$, $SiO_2$ and $TiO_2$ were provided to make samples of the same form as used in Example 1 in the same manner as in Example 1. Dielectric resonators of the same type as in Example 1 were made using these samples and subjected to the characteristic tests in the same manner as in Example 1.

The compositions and test results of these samples are shown in Table 5, in which the compositions of the main components are indicated corresponding to A through H in the ternary composition diagram.

As will be seen from the results of the table, the resonators using the samples of the invention had a specific inductive capacity, $\epsilon$, of 34.8 to 42.5, a no-load Q value of 6200 to 8300, a temperature characteristic of resonance frequency, $\eta f$, of $-26$ to $+27$ ppm/°C., and a surface roughness, Rmax, of 1.1 to 1.90 $\mu$m.

As will be clear from the foregoing examples, the dielectric ceramic compositions of the invention can provide dielectric resonators which have good characteristic such as a specific inductive capacity, $\epsilon$, as high as 34.8 to 42.7, a no-load Q value of 6000 to 8300, and a temperature characteristic of resonance frequency, $\eta f$, of $-19$ to $+28$ ppm/°C. at a temperature of $+25°$ to $+85°$ C. Accordingly, even when the ambient temperature greatly varies, the temperature change of the resonance frequency is so small that any parts for compensating the temperature is unnecessary, ensuring a design of a small-size apparatus.

The ceramic composition of the invention can provide moldings whose surface roughness, Rmax, is below 2 $\mu$m, so that the surface resistance, Rs, of a conductor being coated thereon can be reduced by about 10 to 30% as compared with known ceramic substrates.

The ceramic compositions of the invention may be applied not only as substrates for dielectric resonators, but also as substrates for high frequency circuits and dielectric regulator bars.

TABLE 1

| Sample Numbers | | Compositions (molar ratios) | | | $\epsilon$ | Q | $\eta f$ (ppm/∂) | Rmax ($\mu$m) |
|---|---|---|---|---|---|---|---|---|
| | | x | y | z | | | | |
| 1 | A | 0.98 | 0.01 | 0.01 | 42.7 | 6500 | +28 | 1.9 |
| 2 | E | 0.80 | 0.19 | 0.01 | 38.2 | 6400 | +7 | 1.7 |
| 3 | B | 0.60 | 0.39 | 0.01 | 35.1 | 7000 | −19 | 1.9 |
| 4 | C | 0.60 | 0.18 | 0.22 | 35.4 | 6700 | −15 | 1.9 |
| 5 | D | 0.77 | 0.01 | 0.22 | 36.8 | 6400 | −5.2 | 2.0 |
| 6 | F | 0.86 | 0.10 | 0.04 | 37.5 | 6600 | +0.5 | 1.4 |
| 7 | G | 0.74 | 0.13 | 0.13 | 36.6 | 7400 | −7.6 | 1.5 |
| 8 | H | 0.65 | 0.25 | 0.10 | 35.3 | 6800 | −17 | 1.8 |
| (9) | I | 0.58 | 0.28 | 0.14 | 34.2 | 7100 | −40 | 1.9 |
| (10) | J | 0.68 | 0.08 | 0.24 | 36.0 | 6200 | −15 | 3.3 |
| (11) | K | 0.88 | 0.005 | 0.115 | 49.1 | 6100 | +109 | 4.1 |
| (12) | L | 0.70 | 0.295 | 0.05 | 35.7 | 5200 | −16 | 4.0 |

TABLE 2

| Sample Numbers | | Compositions | | | | $\epsilon$ | Q | $\eta f$ (ppm/∂) | Rmax ($\mu$m) |
|---|---|---|---|---|---|---|---|---|---|
| | | x (molar ratios) | y (molar ratios) | z (molar ratios) | $Al_2O_3$ (parts by weight) | | | | |
| 1 | A | 0.98 | 0.01 | 0.01 | 0.1 | 42.4 | 6600 | +26 | 1.8 |
| 2 | E | 0.80 | 0.19 | 0.01 | 0.1 | 38.0 | 6400 | +5 | 1.6 |
| 3 | B | 0.60 | 0.39 | 0.01 | 0.1 | 35.0 | 7000 | −20 | 1.9 |
| 4 | C | 0.60 | 0.18 | 0.22 | 0.1 | 35.2 | 6700 | −16 | 1.8 |
| 5 | D | 0.77 | 0.01 | 0.22 | 0.1 | 36.8 | 6500 | −5.1 | 1.9 |
| 6 | F | 0.86 | 0.10 | 0.04 | 0.05 | 37.4 | 6700 | 0 | 1.3 |
| 7 | F | 0.86 | 0.10 | 0.04 | 0.1 | 37.3 | 6600 | −1.6 | 1.2 |
| 8 | F | 0.86 | 0.10 | 0.04 | 0.5 | 37.0 | 6400 | −3.3 | 1.0 |
| 9 | F | 0.86 | 0.10 | 0.04 | 1.0 | 36.4 | 6000 | −7.0 | 1.4 |
| (10) | F | 0.86 | 0.10 | 0.04 | 2.0 | 34.1 | 5100 | −33 | 1.6 |
| 11 | G | 0.74 | 0.13 | 0.13 | 0.05 | 36.5 | 7200 | −8.1 | 1.4 |
| 12 | G | 0.74 | 0.13 | 0.13 | 0.1 | 36.5 | 7100 | −9.8 | 1.2 |
| 13 | G | 0.74 | 0.13 | 0.13 | 0.5 | 35.9 | 6600 | −12 | 1.1 |
| 14 | G | 0.74 | 0.13 | 0.13 | 1.0 | 35.6 | 6400 | −16 | 1.4 |
| (15) | G | 0.74 | 0.13 | 0.13 | 2.0 | 33.8 | 6000 | −36 | 1.7 |
| 16 | H | 0.65 | 0.25 | 0.10 | 0.05 | 35.3 | 6700 | −17 | 1.7 |
| 17 | H | 0.65 | 0.25 | 0.10 | 0.1 | 35.2 | 6500 | −18 | 1.5 |

TABLE 2-continued

| Sample Numbers | | x (molar ratios) | y (molar ratios) | z (molar ratios) | Al$_2$O$_3$ (parts by weight) | ε | Q | ηf (ppm/∂) | Rmax (μm) |
|---|---|---|---|---|---|---|---|---|---|
| 18 | H | 0.65 | 0.25 | 0.10 | 0.5 | 35.0 | 6400 | −18 | 1.4 |
| 19 | H | 0.65 | 0.25 | 0.10 | 1.0 | 35.0 | 6000 | −19 | 1.6 |
| (20) | H | 0.65 | 0.25 | 0.10 | 2.0 | 33.5 | 5300 | −37 | 1.9 |

TABLE 3

| Sample Numbers | | x (molar ratios) | y (molar ratios) | z (molar ratios) | La$_2$O$_3$ (parts by weight) | ε | Q | ηf (ppm/∂) | Rmax (μm) |
|---|---|---|---|---|---|---|---|---|---|
| 1 | A | 0.98 | 0.01 | 0.01 | 0.1 | 42.6 | 6600 | +28 | 1.7 |
| 2 | E | 0.80 | 0.19 | 0.01 | 0.1 | 38.0 | 6400 | +5 | 1.6 |
| 3 | B | 0.60 | 0.39 | 0.01 | 0.1 | 35.2 | 7400 | −17 | 1.8 |
| 4 | C | 0.60 | 0.18 | 0.22 | 0.1 | 35.3 | 6800 | −16 | 1.8 |
| 5 | D | 0.77 | 0.01 | 0.22 | 0.1 | 36.8 | 6600 | −5.3 | 1.9 |
| 6 | F | 0.86 | 0.10 | 0.04 | 0.05 | 37.6 | 6900 | +1.0 | 1.3 |
| 7 | F | 0.86 | 0.10 | 0.04 | 0.1 | 37.5 | 6800 | +0.7 | 1.1 |
| 8 | F | 0.86 | 0.10 | 0.04 | 0.5 | 37.3 | 6500 | −1.2 | 1.0 |
| 9 | F | 0.86 | 0.10 | 0.04 | 1.0 | 37.0 | 6200 | −3.2 | 1.3 |
| (10) | F | 0.86 | 0.10 | 0.04 | 2.0 | 36.2 | 3000 | −9.1 | 4.1 |
| 11 | G | 0.74 | 0.13 | 0.13 | 0.05 | 36.7 | 7100 | −6.0 | 1.4 |
| 12 | G | 0.74 | 0.13 | 0.13 | 0.1 | 36.4 | 7200 | −6.9 | 1.1 |
| 13 | G | 0.74 | 0.13 | 0.13 | 0.5 | 36.2 | 6800 | −9.5 | 1.1 |
| 14 | G | 0.74 | 0.13 | 0.13 | 1.0 | 36.0 | 6500 | −11 | 1.3 |
| (15) | G | 0.74 | 0.13 | 0.13 | 2.0 | 35.1 | 2900 | −18 | 4.5 |
| 16 | H | 0.65 | 0.25 | 0.10 | 0.05 | 35.6 | 6800 | −14 | 1.7 |
| 17 | H | 0.65 | 0.25 | 0.10 | 0.1 | 35.4 | 6500 | −15 | 1.6 |
| 18 | H | 0.65 | 0.25 | 0.10 | 0.5 | 35.2 | 6500 | −16 | 1.5 |
| 19 | H | 0.65 | 0.25 | 0.10 | 1.0 | 35.1 | 6100 | −19 | 1.7 |
| (20) | H | 0.65 | 0.25 | 0.10 | 2.0 | 34.4 | 2100 | −30 | 4.6 |

TABLE 4

| Sample Numbers | | x (molar ratios) | y (molar ratios) | z (molar ratios) | Cr$_2$O$_3$ (parts by weight) | ε | Q | ηf (ppm/∂) | Rmax (μm) |
|---|---|---|---|---|---|---|---|---|---|
| 1 | A | 0.98 | 0.01 | 0.01 | 0.1 | 42.5 | 7000 | +28 | 1.7 |
| 2 | E | 0.80 | 0.19 | 0.01 | 0.1 | 39.3 | 7200 | +7 | 1.5 |
| 3 | B | 0.60 | 0.39 | 0.01 | 0.1 | 35.3 | 7500 | −18 | 1.7 |
| 4 | C | 0.60 | 0.18 | 0.22 | 0.1 | 35.4 | 7100 | −15 | 1.6 |
| 5 | D | 0.77 | 0.01 | 0.22 | 0.1 | 36.8 | 6700 | −5.6 | 1.7 |
| 6 | F | 0.86 | 0.10 | 0.04 | 0.05 | 37.5 | 7000 | +1.4 | 1.2 |
| 7 | F | 0.86 | 0.10 | 0.04 | 0.1 | 37.4 | 6900 | +0.9 | 1.1 |
| 8 | F | 0.86 | 0.10 | 0.04 | 0.5 | 37.0 | 6600 | −3.4 | 0.9 |
| 9 | F | 0.86 | 0.10 | 0.04 | 1.0 | 36.6 | 6400 | −7.7 | 1.2 |
| (10) | F | 0.86 | 0.10 | 0.04 | 2.0 | 34.4 | 5500 | −36 | 1.5 |
| 11 | G | 0.74 | 0.13 | 0.13 | 0.05 | 36.7 | 7500 | −7.4 | 1.2 |
| 12 | G | 0.74 | 0.13 | 0.13 | 0.1 | 36.5 | 7400 | −7.1 | 1.3 |
| 13 | G | 0.74 | 0.13 | 0.13 | 0.5 | 36.0 | 7000 | −1.1 | 1.1 |
| 14 | G | 0.74 | 0.13 | 0.13 | 1.0 | 35.7 | 6800 | −14 | 1.3 |
| (15) | G | 0.74 | 0.13 | 0.13 | 2.0 | 33.8 | 6300 | −39 | 1.5 |
| 16 | H | 0.65 | 0.25 | 0.10 | 0.05 | 35.4 | 7000 | −18 | 1.6 |
| 17 | H | 0.65 | 0.25 | 0.10 | 0.1 | 35.4 | 6800 | −17 | 1.4 |
| 18 | H | 0.65 | 0.25 | 0.10 | 0.5 | 35.1 | 6700 | −20 | 1.4 |
| 19 | H | 0.65 | 0.25 | 0.10 | 1.0 | 35.0 | 6300 | −22 | 1.4 |
| (20) | H | 0.65 | 0.25 | 0.10 | 2.0 | 33.6 | 5700 | −41 | 1.5 |

TABLE 5

| Sample Numbers | | x (molar ratios) | y (molar ratios) | z (molar ratios) | Al$_2$O$_3$ (parts by weight) | La$_2$O$_3$ (parts by weight) | Cr$_2$O$_3$ (parts by weight) | ε | Q | ηf ppm/∂ | Rmax (μm) |
|---|---|---|---|---|---|---|---|---|---|---|---|
| 1 | A | 0.98 | 0.01 | 0.01 | 0.1 | 0.1 | — | 42.5 | 6200 | +27 | 1.7 |
| 2 | E | 0.80 | 0.19 | 0.01 | 0.1 | 0.1 | — | 37.9 | 6400 | +4 | 1.5 |
| 3 | B | 0.60 | 0.39 | 0.01 | 0.1 | 0.1 | — | 35.1 | 7100 | −18 | 1.8 |
| 4 | C | 0.60 | 0.18 | 0.22 | 0.1 | 0.1 | — | 35.3 | 6600 | −15 | 1.7 |

TABLE 5-continued

| | | Compositions | | | | | | | | | |
|---|---|---|---|---|---|---|---|---|---|---|---|
| Sample Numbers | | x (molar ratios) | y (molar ratios) | z (molar ratios) | $Al_2O_3$ (parts by weight) | $La_2O_3$ (parts by weight) | $Cr_2O_3$ (parts by weight) | $\epsilon$ | Q | $\eta f$ ppm/∂ | Rmax (μm) |
| 5 | D | 0.77 | 0.01 | 0.22 | 0.1 | 0.1 | — | 36.9 | 6400 | −5.7 | 1.9 |
| 6 | F | 0.86 | 0.10 | 0.04 | 0.1 | 0.1 | — | 37.5 | 6700 | +0.6 | 1.3 |
| 7 | F | 0.86 | 0.10 | 0.04 | 0.5 | 0.5 | — | 36.7 | 6300 | −6.2 | 1.3 |
| 8 | G | 0.74 | 0.13 | 0.13 | 0.1 | 0.1 | — | 36.0 | 7100 | −11 | 1.3 |
| 9 | G | 0.74 | 0.13 | 0.13 | 0.5 | 0.5 | — | 35.7 | 6500 | −13 | 1.4 |
| 10 | H | 0.65 | 0.25 | 0.10 | 0.1 | 0.1 | — | 35.1 | 6800 | −17 | 1.6 |
| 11 | H | 0.65 | 0.25 | 0.10 | 0.5 | 0.5 | — | 35.0 | 6300 | −19 | 1.7 |
| 12 | A | 0.98 | 0.01 | 0.01 | 0.1 | — | 0.1 | 42.0 | 7100 | +26 | 1.6 |
| 13 | B | 0.60 | 0.39 | 0.01 | 0.1 | — | 0.1 | 35.2 | 8000 | −18 | 1.6 |
| 14 | C | 0.60 | 0.18 | 0.22 | 0.1 | — | 0.1 | 35.4 | 7700 | −16 | 1.5 |
| 15 | D | 0.77 | 0.01 | 0.22 | 0.1 | — | 0.1 | 36.8 | 7400 | −5.9 | 1.6 |
| 16 | G | 0.74 | 0.13 | 0.13 | 0.1 | — | 0.1 | 36.1 | 7800 | −10 | 1.1 |
| 17 | A | 0.98 | 0.01 | 0.01 | — | 0.1 | 0.1 | 42.2 | 7200 | +27 | 1.6 |
| 18 | B | 0.60 | 0.39 | 0.01 | — | 0.1 | 0.1 | 35.3 | 8300 | −17 | 1.6 |
| 19 | C | 0.60 | 0.18 | 0.22 | — | 0.1 | 0.1 | 35.4 | 7600 | −15 | 1.6 |
| 20 | D | 0.77 | 0.01 | 0.22 | — | 0.1 | 0.1 | 36.7 | 7500 | −6.4 | 1.5 |
| 21 | G | 0.74 | 0.13 | 0.13 | — | 0.1 | 0.1 | 36.0 | 7900 | −12 | 1.2 |
| 22 | A | 0.98 | 0.01 | 0.01 | 0.1 | 0.1 | 0.1 | 41.6 | 7200 | +24 | 1.6 |
| 23 | B | 0.60 | 0.39 | 0.01 | 0.1 | 0.1 | 0.1 | 35.0 | 8100 | −21 | 1.5 |
| 24 | C | 0.60 | 0.18 | 0.22 | 0.1 | 0.1 | 0.1 | 35.2 | 7700 | −19 | 1.6 |
| 25 | D | 0.77 | 0.01 | 0.22 | 0.1 | 0.1 | 0.1 | 36.6 | 7500 | −7.2 | 1.5 |
| 26 | G | 0.74 | 0.13 | 0.13 | 0.1 | 0.1 | 0.1 | 36.0 | 7800 | −12 | 1.2 |
| 27 | G | 0.74 | 0.13 | 0.13 | 0.2 | 0.2 | 0.2 | 35.1 | 8200 | −20 | 1.5 |
| 28 | G | 0.74 | 0.13 | 0.13 | 0.3 | 0.3 | 0.3 | 34.8 | 7900 | −26 | 1.2 |

What is claimed is:

1. A dielectric ceramic composition consisting essentially of $xZrO_2\text{-}yCeO_2\text{-}zSiO_2\text{-}TiO_2$, in which $x+y+z=1$, and x, y and z are mole fractions that lie on or within the four-sided polygon in the ternary composition diagram shown in the attached drawing, wherein the corners of said polygon are points A, B, C and D that are defined by the following coordinates:

| | x | y | z |
|---|---|---|---|
| A | 0.98 | 0.01 | 0.01 |
| B | 0.60 | 0.39 | 0.01 |
| C | 0.60 | 0.18 | 0.22 |
| D | 0.77 | 0.01 | 0.22 |

2. A dielectric ceramic composition consisting essentially of $xZrO_2\text{-}yCeO_2\text{-}zSiO_2\text{-}TiO_2$, in which $x+y+z=1$, and x, y and z are mole fractions that lie on or within the four-sided polygon in the ternary composition diagram shown in the attached drawing, wherein the corners of said polygon are points A, B, C and D that are defined by the following coordinates:

| | x | y | z |
|---|---|---|---|
| A | 0.98 | 0.01 | 0.01 |
| B | 0.60 | 0.39 | 0.01 |
| C | 0.60 | 0.18 | 0.22 |
| D | 0.77 | 0.01 | 0.22, | and at least one oxide selected from the group consisting of $Al_2O_3$, $La_2O_3$ and $Cr_2O_3$ in an amount of from 0.05 to 1.0 part by weight per 100 parts be weight of the sum of $ZrO_2$, $CeO_2$, $SiO_2$ and $TiO_2$.

3. The dielectric ceramic composition according to claim 2, wherein said at least one oxide is $Al_2O_3$.

4. The dielectric ceramic composition according to claim 2, wherein said at least one oxide is $La_2O_3$.

5. The dielectric ceramic composition according to claim 2, wherein said at least one oxide is $Cr_2O_3$.

* * * * *

UNITED STATES PATENT AND TRADEMARK OFFICE
CERTIFICATE OF CORRECTION

PATENT NO. : 4 584 282
DATED : April 22, 1986
INVENTOR(S) : Kazuo SASAZAWA et al It is certified that error appears in the above-identified patent and that said Letters Patent is hereby corrected as shown below:

Column 10, line 39; change "be weight" to ---by weight---.

Signed and Sealed this
Fourteenth Day of October, 1986

[SEAL]

*Attest:*

DONALD J. QUIGG

*Attesting Officer*     *Commissioner of Patents and Trademarks*